United States Patent Office.

CHARLES E. MICHEL, OF ST. LOUIS, MISSOURI, ASSIGNOR TO FREDERICK VON PHUL, OF THE SAME PLACE.

Letters Patent No. 71,777, dated December 3, 1867.

IMPROVED MINERAL-WATER.

The Schedule referred to in these Letters Patent and making part of the same.

Be it known that I, CHARLES E. MICHEL, of the city and county of St. Louis, and State of Missouri, have invented a new and useful Way of Manufacturing Carbonated Chalybeate Water for medical purposes; and I do hereby declare that the following is a full, clear, and exact description of the same.

Mode of Production.

Make use of the usual apparatus for manufacturing carbonic acid water, commonly called "mineral" or "soda-water;" prepare the receiver just as if the water in it were about to be charged simply with carbonic acid gas; add to the water (which should be pure) the proportion of *Ferrum redactum* (Quevennes iron) with which it is desired to impregnate the water; then the contents of the receiver may be impregnated with the carbonic acid gas in the usual way.

Notes.

The quantity of iron added may be varied, so as to slightly or strongly impregnate the water with iron, and the water containing the iron may be more or less charged with carbonic acid gas, all as may be required. If found necessary, all atmospheric air may be excluded in the process, by completely filling the receiver with boiled rain-water.

The water used should be free from all impurities, salts, or other chemical compounds, except in cases where the action of certain remedial agents may be required, when such may be added.

What I claim as my invention, and desire to secure by Letters Patent, is—

The mode of producing carbonated chalybeate water, hereinabove described, it being an artificial chalybeate water, containing the carbonate of the protoxide of iron.

CHAS. E. MICHEL.

Witnesses:
GEORGE C. BUNSEN,
EUGENE SPANGENBERG.